United States Patent
Bahl et al.

(10) Patent No.: US 7,519,393 B2
(45) Date of Patent: *Apr. 14, 2009

(54) METHOD FOR WIRELESS CAPABILITY DISCOVERY AND PROTOCOL NEGOTIATION, AND WIRELESS DEVICE INCLUDING SAME

(75) Inventors: Pradeep Bahl, Redmond, WA (US); Amer Hassan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 167 days.

This patent is subject to a terminal disclaimer.

(21) Appl. No.: 11/197,802

(22) Filed: Aug. 5, 2005

(65) Prior Publication Data

US 2006/0116148 A1 Jun. 1, 2006

Related U.S. Application Data

(63) Continuation of application No. 10/136,065, filed on May 1, 2002, now Pat. No. 6,957,086.

(51) Int. Cl.
*H04B 1/38* (2006.01)

(52) U.S. Cl. .................. 455/557; 455/517; 455/73; 370/401; 370/310

(58) Field of Classification Search .......... 455/507, 455/557, 517, 73; 348/143; 370/401, 310
See application file for complete search history.

(56) References Cited

U.S. PATENT DOCUMENTS

| | | | |
|---|---|---|---|
| 5,850,181 A | 12/1998 | Heinrich et al. | |
| 6,807,165 B2 | 10/2004 | Belcea | |
| 2003/0140129 A1 | 7/2003 | Livnat et al. | |
| 2003/0162556 A1* | 8/2003 | Libes | 455/507 |
| 2003/0203740 A1 | 10/2003 | Bahl et al. | |
| 2004/0179469 A1 | 9/2004 | Attar et al. | |
| 2004/0181569 A1 | 9/2004 | Attar et al. | |

(Continued)

FOREIGN PATENT DOCUMENTS

WO    WO 01/58108    8/2001

(Continued)

OTHER PUBLICATIONS

Glenn Fleishman, *New Wireless Standards Challenge 802.11b*, The O'Reilly Network, at http://www.oreillynet.com/lpt/a//wireless/2001/05/08/standards.html (Jun. 8, 2001).

(Continued)

*Primary Examiner*—Alexander Eisen
*Assistant Examiner*—Wayne Cai
(74) *Attorney, Agent, or Firm*—Wolf, Greenfield & Sacks, P.C.

(57) ABSTRACT

A protocol and method for establishing wireless data sessions between wireless clients, each of which support multiple wireless protocols is presented. A commonly supported wireless protocol is utilized to share the wireless protocols supported by the clients' circuitry. A wireless data session is then established based on the common capabilities of the wireless clients. Where multiple common protocols are supported, user preferences are utilized to determine which of the commonly supported protocols will be utilized for the wireless data session. Once a data session is established, the control channel may be idled periodically to conserve power. Alternatively, the protocol utilized in the wireless data session may be used to transmit control messages using the protocol of the present invention.

13 Claims, 4 Drawing Sheets

U.S. PATENT DOCUMENTS

2005/0030375 A1* 2/2005 Zangrande et al. .......... 348/143

OTHER PUBLICATIONS

Rob Flickenger, *802.11b Tips, Tricks, and Facts*, The O'Reilly Network, at http://www.oreillynet.com/lpt/a//wireless/2001/03/02/802.11b_facts.html (Mar. 2, 2001).

Press Release, Atheros Communications, Atheros Ships Combo Chipset Rolling Three WLAN Standards into a Single Solution (Mar. 11, 2002), at www.atheros.com/news/combo.html.

Atheros Communications, *AR5001X Combo WLAN Solution Brochure*, available at www.atheros.com, Apr. 12, 2002.

Carmen Nobel, *For WLAN, It's 802.11b*, Eweek, at www.eweek.com/print_article/0,3668,a=18648,00.asp (Nov. 19, 2001).

Benini, Luca, et al., "Monitoring System Activity for OS-Directed Dynamic Power Management", *In Proceedings of 1998 ACM ISLPED*, pp. 185-190.

Benini, Luca, et al., "Dynamic Power Management of Electronic Systems", in *Proceedings of the 1998 IEEE/ACM ICCAD*, Nov. 8-12, 1998, San Jose CA, pp. 696-704.

Hinckley, K., et al., "Sensing Techniques for Mobile Interaction", *ACM UIST 2000 Symposium on User Interface Software & Technology*, CHI Letters 2 (2), pp. 91-100.

*Intel Microsoft Toshiba*, "Advanced Configuration and Power Interface", Revision 1.0, Feb. 2, 1999, 323 pages.

Simunic, Tajana, et al., "Dynamic Power Management for Portable Systems", *In Proceedings of ACM MOBICOM 2000*, Aug. 2000, Boston, MA pp. 11-19.

Simunic, Tajana, et al., "Dynamic Voltage Scaling and Power Management for Portable Systems", *In Proceedings of ACM DAC 2001*, Aug. 2001, pp. 524-529.

Nandagopal, T., et al., "A Unified Architecture for the Design and Evaluation of Wireless Fair Queueing Algorithms", ACM MobiCom 1999, in proceedings of *The Fifth Annual ACM/IEE International Conference on Mobile Computing and Networking* (Aug. 1999) pp. 132-142.

Keshav, S., "On the Efficient Implementation of Fair Queueing" *Internetworking, Research and Experience*, vol. 2, No. 3., 157-173 (1991).

Bharghavan, V., et al., "Fair Queuing in Wireless Networks: Issues and Approaches", *IEEE Personal Communications Magazine*, pp. 44-53 (Feb. 1999).

Parekh, A.K., et al., "A Generalized Processor Sharing Approach to Flow Control in Integrated Services Networks: The Single-Node Case", *IEEE/ACM Transactions on Networking*, vol. 1, No. 3, pp. 344-357 (Jun. 1993).

Parekh, A.K., et al., "A Generalized Processor Sharing Approach to Flow Control in Integrated Services Networks: The Multiple Node Case", *IEEE/ACM Transactions on Networking*, vol. 2, No. 2, pp. 137-150 (Mar. 1994).

NG, T.S., "Packet Fair Queueing: Algorithms for Wireless Networks with Location-Dependent Errors", *Proceedings of IEEE INFOCOM '98, The Conference on Computer Communications vol. 3, Seventh Annual Joint Conference of the IEEE Computer and Communications Societies*, pp. 1103-1111 (Mar. 1998).

Lettieri et al.; "Advances in Wireless Terminals," *IEEE Personal Communications*, vol. 6, No. 1, (Feb. 1999), pp. 6-19.

Yung-Hsiang Lu et al.; "Requester-Aware Power Reduction," *IEEE*; Sep. 20, 2000, pp. 18-23.

Benini et al.; "System-level Dynamic Power Management," Low-Power Design, 1999; Proceedings. IEEE Alessandro Volta Memorial Workshop On Como, Italy Mar. 4-5, 1999, Los Alamitos, CA, USA, *IEEE Comput. Soc*, US, Mar. 4, 1999, pp. 23-31.

Liu, Jun, et al., "Using Loss Pairs to Discover Network Properties", *ACM SIGCOM Internet Measurement Workshop*, 2001, 12 pages.

Zhang, Yin, et al., "On the Constancy of Internet Path Properties", *SIGCOM Internet Measurement Workshop*, 2001, 15 pages.

Lai, Kevin, et al., "Measuring Link Bandwidths Using A Deterministic Model of Packet Delay", *In Proceedings of ACM SIGCOM 2000*, 12 pages.

Balakrishnan, Hari, et al., "Analyzing Stability in Wide-Area Network Performance", *In Proceedings of CAN SIGMETRICS Conference on Measurement & Modeling of Computer Systems*, Seattle, WA Jun. 1997, 11 pages.

Yavatkar, R., et al., "SBM (Subnet Bandwidth Manager): A Protocol for RSVP-based Admission Control Over IEEE 802-style Networks", *IETF RFC 2814*, retrieved from http://www.faws.org/rfcs/rfc2814.html on May 19, 2002.

Breslau, Lee, et al., "Endpoint Admission Control: Architectural Issues and Performance", *In Proceedings of ACM SIGCOMM 2000*, pp. 57-69.

Chiasserini, Carla, F., "Combining Paging with Dynamic Power Management", in *IEEE INFOCOM* 2001, pp. 996-1004.

Shih, Eugene, et al., "Wake on Wireless: An Event Driven Energy Saving Strategy for Battery Operated Devices", *MOBICOM '02*, Sep. 23-26, 2002, pp. 1-12.

Chunlong, Guo, et al., Low Power Distributed MAC for Ad Hoc Sensor Radio Networks, *IEEE*, 2001, pp. 294492948.

Intel: Intel PRO/Wireless LAN Solution, *Intel Wireless Gateway*, pp. 1-3, Sep. 9, 2001.

* cited by examiner

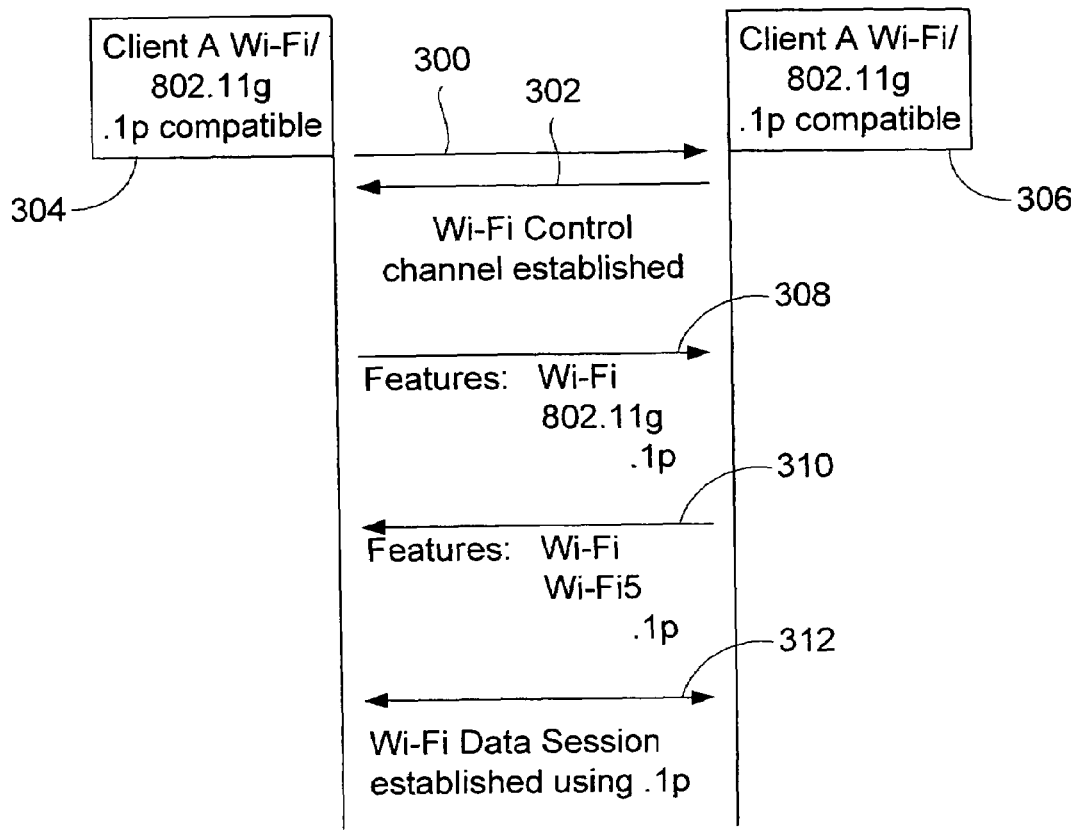
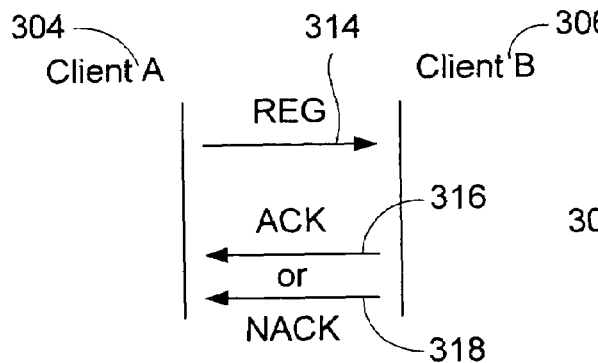
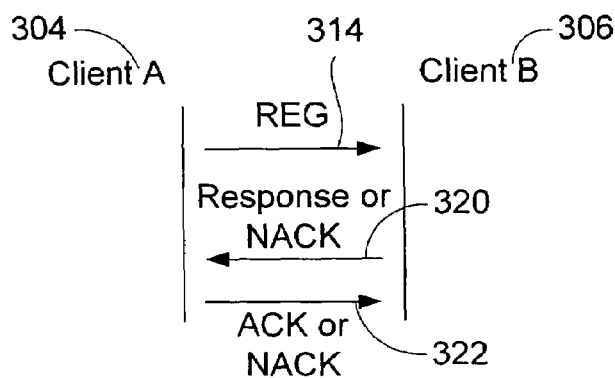

METHOD FOR WIRELESS CAPABILITY DISCOVERY AND PROTOCOL NEGOTIATION, AND WIRELESS DEVICE INCLUDING SAME

CROSS-REFERENCE TO RELATED PATENT APPLICATION

This patent application is a continuation of U.S. patent application Ser. No. 10/136,065, filed May 1, 2002, now U.S. Pat. No. 6,957,086, entitled "Method For Wireless Capability Discovery And Protocol Negotiation, And Wireless Device Including Same." The entire teachings and disclosure of this patent are hereby incorporated in their entireties by reference thereto.

FIELD OF THE INVENTION

This invention relates generally to wireless communication protocols and, more particularly, to protocols and methods that enable discovery of wireless capabilities of clients and that configure the wireless clients to communicate via a common wireless protocol.

BACKGROUND OF THE INVENTION

With the development and deployment of wireless networking devices and infrastructures, consumers and businesses are increasingly being able to realize the benefits of true mobile computing, collaboration, and information exchange. No longer are business travelers required to carry an assortment of cables and search endlessly for an available data port simply to connect to a network to retrieve email messages, download files, or exchange information. No longer are companies and home consumers restrained in where they may access their networks by the location of the Ethernet jacks on the wall. Meeting participants and groups of friends may now form their own ad hoc networks without connecting cables between themselves or logging in to some preexisting network.

However, while the concept of mobile computing on wireless networks is well accepted, the implementation of this concept has taken on many forms. That is, there now exists several different wireless protocol standards that are competing in the marketplace. These standards include 802.11b (also know as Wi-Fi for wireless fidelity), 802.11a (also know as Wi-Fi5), 802.11g, HomeRF, Bluetooth, Wireless 1394, HiperLAN2, UWB, ZigBee, etc. Each of these different standards have particular advantages and were and are being developed with particular applications and users in mind. Unfortunately, these standards are not compatible with one another and do not allow interoperability of wireless devices implementing these different standards.

Of these standards, 802.11b, 802.11g, HomeRF, Bluetooth, and Zigbee operate over the 2.4 GHz unlicensed band. The IEEE 802.11b standard (Wi-Fi) provides wireless transmission of up to 11 Mbps of data at distances ranging up to 300 feet indoors to well over 1000 feet line-of-sight outdoors. The distance depends on impediments, materials, and line of sight. 802.11b is an extension of Ethernet to wireless communication. The standard is backward compatible to earlier specifications, known as 802.11, allowing speeds of 1, 2, 5.5 and 11 Mbps on the same transmitters. The 802.11g standard is being developed as a high rate Wi-Fi standard, allowing data rates above 22 Mbps. The standard requires orthogonal frequency division multiplexing (OFDM), which allows for data rates up to 54 Mbps. The standard also allows for the use of packet binary convolutional code (PBCC), which provides data rates up to 22 Mbps (later version up to 33 Mbps), and complementary code keying-orthogonal frequency division multiplexing (CCK-OFDM), which provides data rates up to 33+ Mbps.

HomeRF initially provided data rates of only 2 Mbps, but have now been able to increase up to 10 Mbps with release of version 2.0 of its specification. The primary advantage of HomeRF is the integration of voice and data into its baseline data transmission. As such, HomeRF hubs allow the use of cordless phone handsets as well as computers for transmitting data. Bluetooth also utilizes the 2.4 GHz band and is a low-bandwidth, short-range (approximately 30 feet), low-power synchronization and data transfer protocol, not meant for true full-blown networking. This allows small devices such as personal digital assistance (PDAs), laptops, cell phones, etc. to exchange information without a full TCP/IP stack.

Two of the wireless standards introduced above operate over the 5 GHz band. These include 802.11a and the European HiperLAN2 standards. The IEEE 802.11a standard (Wi-Fi5) provides wireless transmission of up to 54 Mbps of data. While the Wi-Fi5 data rates are higher due to the higher frequency and greater bandwidth allotment, because the same power limits apply, Wi-Fi5 range is limited to only a few dozen feet. Hiperlan2 is being developed for deployment in Europe and utilizes similar technologies as 802.11a. Indeed, the physical layers (PHYs) are almost identical. The main differences are at the media access control (MAC) layer. The 802.11a's MAC provides 'wireless Ethernet' functionality and was extended to this band from the 802.11 b's specification. In contrast, HiperLAN2 supports time critical services as well as asynchronous data. HiperLAN2 is compatible with various networks and includes transmit power control and dynamic frequency selection, which should provide greater spectrum efficiency and lower interference with other systems operating on 5 GHz.

Because of the existence of these multiple standards and the deployment of various devices that implement them, the manufactures of the radio chips have started supporting multiple standards on a single chip. In this way, they can keep their manufacturing costs down and increase their market share by supplying their chips to device manufactures regardless of the particular standard that that device supports. Indeed, this multiple standard support on the chips has now enabled the device manufactures to provide devices that can communicate via these different standards.

However, while the ability to support multiple standards on wireless devices is clear, the selection mechanism is not. That is, while the device may include a chip that enables communication via one of multiple standards, the users are still required to select which standard to use in a particular computing situation. The user must know the standard utilized by the network or other wireless device to which the user wishes to connect and must select that standard for operation. The multiple standard support provided by Atheros Communications, Inc. in their Atheros Combo Chipset includes SmartSelect™ technology which claims to transparently connect to 802.11a, 802.11b, or 802.11g networks. The chip purportedly automatically chooses the optimal RF technology (a/b/g), rate adaptation and error correction methods, power reduction and internationalization features, and security protocol for a wireless network, and dynamically adapts to changing conditions as the user roams within that network.

Unfortunately, the user may specify other preferences for selection of a wireless standard when many standards are available for use. These preferences may override the chip's determination of what is optimal from a signal strength standpoint. Further, while the chip may vary its operating parameters as conditions change (e.g. increase power utilization, decrease or increase data rate, etc.), there is no mechanism that allows seamless transfer to another wireless standard. There exists a need, therefore, for a system and method that will discover the wireless capabilities of other wireless peers and access points (APs) and that will configure the wireless peers and APs to communicate using a compatible wireless protocol based on user preferences. Further, there is a need for a system and method that will allow transfer to different wireless standards based on network conditions, type of data to be transferred, user preferences, etc.

BRIEF SUMMARY OF THE INVENTION

In view of the above, it is an objective of the present invention to provide a new and improved wireless discovery and configuration protocol. More particularly, it is an objective of the present invention to provide a new and improved wireless discovery and configuration protocol that will enable wireless clients that can communicate via various wireless protocols to discover each other and negotiate a desirable, common protocol for use between them. When there are multiple common protocols supported by each device, user preferences may be used to select the desired protocol.

In accordance with one embodiment of the present invention, two wireless devices utilize a common, baseline wireless protocol to establish a control channel between them. Once this control channel has been established, each of the wireless devices transmits its wireless capabilities to the other. These wireless capabilities include, for example, the various wireless protocols supported by the device, as well as information such as whether the device supports packet tagging, etc. Each of the devices then compares its capabilities with those of the wireless device with whom it wishes to communicate to determine the common wireless capabilities between them. These common capabilities are then used to configure the wireless devices for use in a wireless data session.

Where the comparison reveals that there are multiple commonly supported protocols, user preferences are then utilized to determine which of the common protocols should be used. However, recognizing that the preferences of one wireless device may not be acceptable to the wireless device to which it would like to communicate, the present invention includes protocol preference negotiation between the two wireless devices to select an acceptable wireless protocol for use between them.

Once a particular wireless protocol is selected for the wireless data session, changes in system parameters may necessitate a change in the wireless protocol utilized. Such change may be effectuated by transmitting a control message via the control channel to the other wireless device requesting the change in wireless protocol. In an alternate embodiment, a control message is configured and transmitted using the wireless protocol being used for the wireless data session to request the change to an alternate wireless protocol.

In an embodiment of the present invention where a wireless protocol different than that utilized in the establishment of the control channel is used for the wireless data session, the system of the present invention idles the communications circuitry associated with that control channel protocol to conserve energy in the wireless device. The system then periodically activates this circuitry to allow for the passing of any additional control messages on this control channel. The period between activation cycles may be varied based on a number of factors including signal fidelity of the wireless protocol utilized in the data session.

A wireless device constructed in accordance with the teachings of the present invention includes a network interface card that has the communications circuitry necessary to communicate a wireless protocol. In one embodiment of the invention this network interface supports communication via multiple wireless protocols. The wireless device also includes a wireless capabilities manager that configures the network interface circuitry in accordance with an appropriate wireless protocol. This manager determines the appropriate wireless protocol utilizing the methods discussed above.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3 is a simplified communication flow diagram illustrating capability negotiation and establishment of a wireless communication session in accordance with an embodiment of the present invention;

FIG. 4 is a simplified wireless configuration control protocol flow diagram of an embodiment of the present invention;

FIG. 5 is an simplified wireless configuration control protocol flow diagram of an alternate embodiment of the present invention

DETAILED DESCRIPTION OF THE INVENTION

Figure 1:
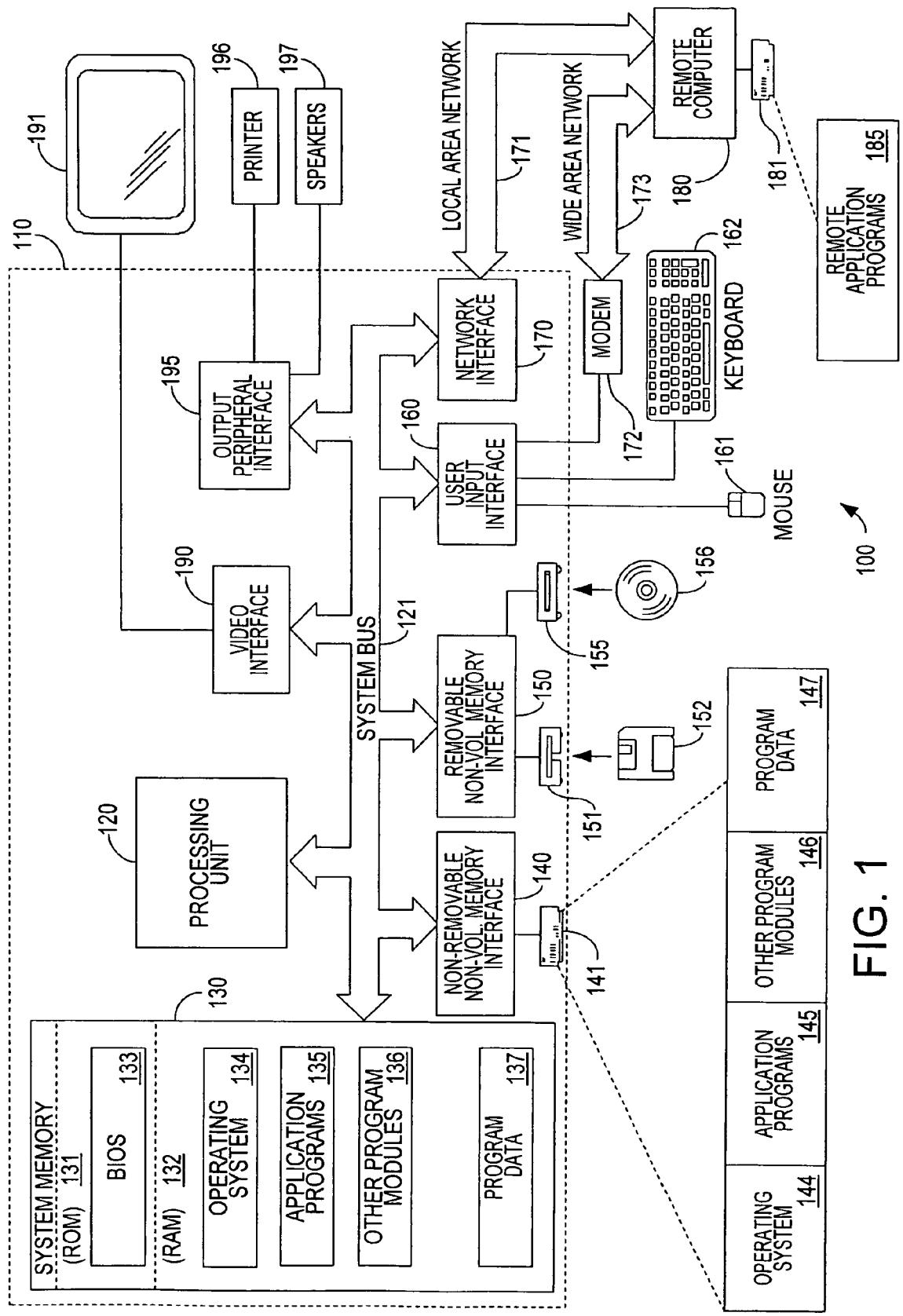
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices such as PDAs and phones, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, industrial devices, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, network card, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
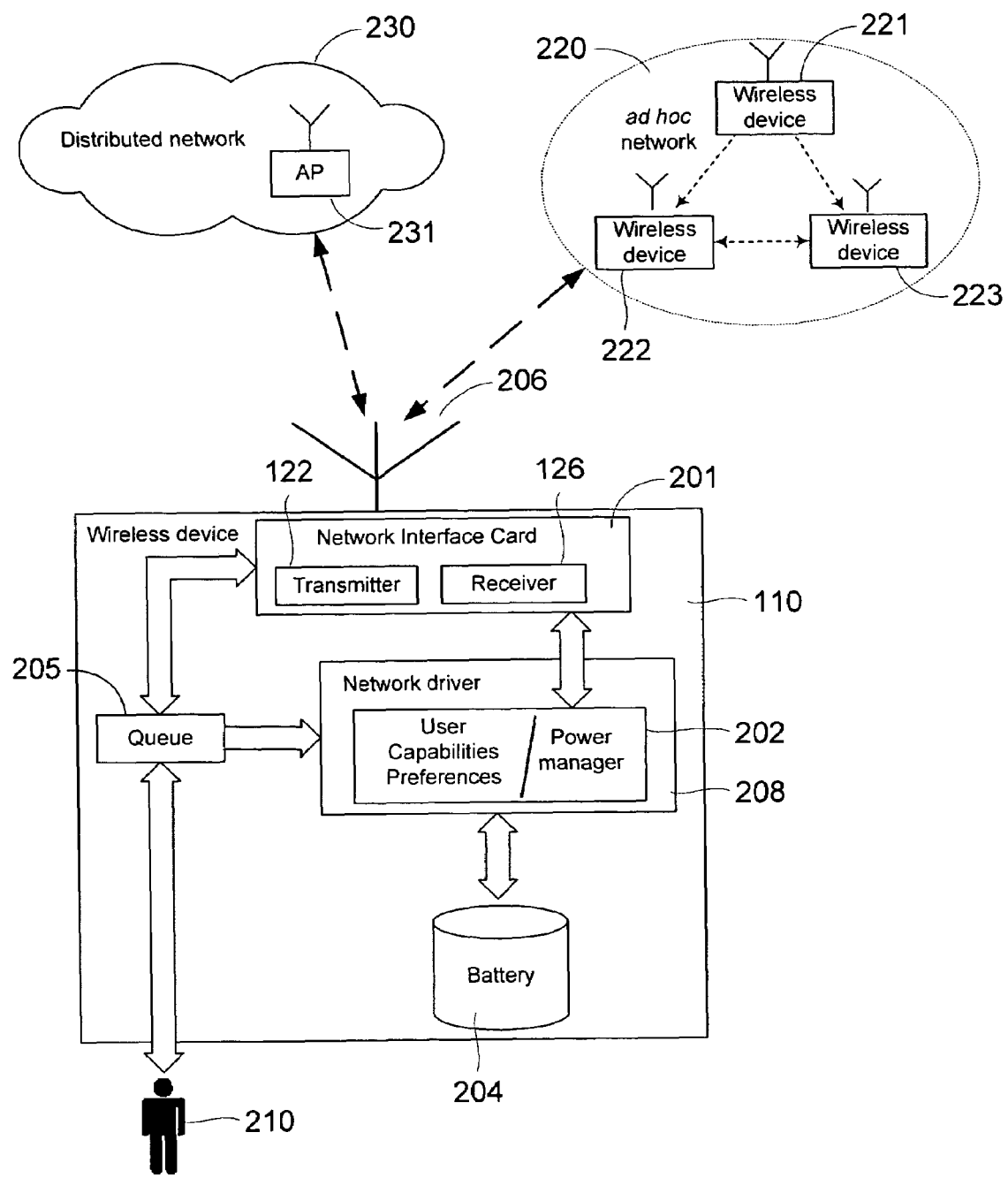
FIG. 2 is a simplified block diagram illustrating an exemplary computer system configured to communicate wirelessly with distributed and ad hoc networks in accordance with one embodiment of the present invention.

In keeping with the intended application of the invention, the device 110 is configured as a wireless mobile device as illustrated in FIG. 2. To that end, the device 110 is provided with a portable power source 204, such as a battery pack or the like. The power source 204 provides power for computations and wireless data transmissions by the device 110. The wireless computing device 110 further includes a network interface card 201 for wirelessly communicating with different types of wireless networks. The network interface card includes a transmitter 122, which is coupled to an antenna 206 for transmitting data wirelessly over a suitable frequency channel. A receiver 126 is also coupled to the antenna 206 for receiving communication packets wirelessly transmitted from the networks with which the device is communicating. In one embodiment, the network interface card 201 employs wireless zero configuration (WZC) scheme of the IEEE 802.11 standard for wireless connections to wireless networks, including infrastructure networks 230 and ad hoc networks 220. Exemplary network interface cards may be in the form of a wireless PC Card for use in laptops, may be embodied in add on wireless adapters, may be integrated into the device 110 such that wireless capability is inherent in the device itself, etc. As discussed above, the network interface card 201 may include hardware support for multiple wireless protocols, or may be a single protocol card. These wireless protocols include 802.11b (Wi-Fi), 802.11a (Wi-Fi5), 802.1g, HomeRF, Bluetooth, Zigbee, UWB, Wireless 1394, HiperLAN2, etc.

Through the wireless network interface card 201, the wireless computing device 110 may communicate with different types of wireless networks. For instance, in the illustrated environment of FIG. 2, the wireless device 110 may be connected wirelessly to an infrastructure network 230 through an access point 231 thereof. The wireless device 110 may also be part of a peer-to-peer network 220, also referred to as an ad hoc network, that includes other wireless devices, such as the wireless devices 221, 222, and 223. Before connecting to either the access point 231 of the infrastructure network 230 or to the ad hoc network 220, the wireless device 110 may be in a state of searching for an association by periodically scanning for beacon signals transmitted by the access point 231 or other devices 221, 222, 223.

A network driver 208 controls the operation of the network interface card 201. The network driver 208 is either part of the operating system of the wireless device 110 or a separate executable program running on the wireless device 110. An exemplary network driver is the Windows Management Instrument (WMI) of Microsoft Corporation. The network driver 208 includes a user capabilities manager 202 that determines and controls, e.g. what wireless protocols are supported and will be used by the wireless network interface card 201, what security is supported, etc. This manager 202 may also enable the user 210 to set user preferences for wireless connectivity.

The network driver 208 may also provide power management for managing the power consumption of the network interface card 201. Such a power management system is described in co-pending application Ser. No. 10/141,662, filed May 8, 2002, entitled Method And System For Managing Power Consumption Of A Network Interface Module In A Wireless Computing Device, assigned to the assignee of the instant application, the teachings and disclosure of which are hereby incorporated in their entireties by reference thereto. A system queue 205 is used to store communication packets from a user 210 that are to waiting to be sent out by the transmitter 122. The system queue is also used to store packets received by the receiver 126.

While many wireless devices included network interface cards that supported only a single wireless protocol, as discussed above, many network interface card and chip manufacturers are beginning to support multiple wireless protocols on their products. Indeed, continued support for wireless devices currently on the market will be required even as newer wireless protocols and devices compliant therewith are introduced to the market. Also recognizing that various wireless devices may utilize differing wireless protocols, wireless network service providers will be motivated to support these various protocols to increase the potential client base that they may serve.

Recognizing these technological advances and anticipating the needs introduced thereby, the system of the present invention utilizes the user wireless capabilities/preferences manager 202 to facilitate wireless computing between different wireless computing devices that may have different capabilities. This manager 202 utilizes, in one embodiment, a commonly supported wireless protocol to establish a control channel as illustrated in FIG. 3 as communication lines 300, 302 between wireless clients 304, 306. In one embodiment the wireless control channel utilizes the 802.11b or Wi-Fi standard as the protocol for the control channel. This standard is chosen because it is envisioned that a majority of wireless computing devices will, at a minimum, support this basic wireless protocol. In other embodiments of the present invention, a different wireless protocol such as the extremely low cost Zigbee for instance may be utilized to establish the control channel.

Once the control channel has been established between the two clients 304, 306, including any required exchanges of security information, client A then sends 308 its wireless capabilities to the other client 306. This client 306 also sends 310 its wireless capabilities to client A 304. Since each client in this example only shares support for a common wireless protocol, i.e. the 802.11b or Wi-Fi protocol, the clients utilize 312 this common protocol for their data session. However, since each client also supports the IEEE 802.1p packet tagging, their data session will utilize .1p tagging.

As may be seen, the manager 202 of the present invention utilizes the control channel to determine the capabilities that are in common between its client and the client or access point with which it wishes to establish a data session. In the simplistic example illustrated in FIG. 3, the two wireless clients 304, 306 only shared a single common wireless protocol, and each supported 802.1p tagging. However, if more than one common wireless protocol is supported in each wireless client, the manager 202 will then need to rely on user preferences to determine which of the commonly supported protocols should be utilized in the data session.

These user preferences will take into account many different parameters, including, for example, data speed, power consumption, the type of traffic to be passed during the wireless session, the cost of communicating via the different protocols, preferred service provider support, access point conditioning, signal strength, etc. Indeed, a wireless user may have various profiles that may be activated based on location awareness when establishing the wireless session. For example, a user may have different user profiles when traveling on business as opposed to vacationing for pleasure even though the user carries the same wireless device and is traveling through the same airport.

When these additional user preferences are taken into account by the manager 202, additional negotiation between the wireless clients may be required before the wireless data session is established. That is, once the wireless clients have discovered each other and have profiled their capabilities to one another, a negotiations phase may be instituted. In one embodiment the negotiation takes the form of a request message 314 from one client 304 to the other client 306 indicating the first client's 304 preferences among the various common wireless protocols as illustrated in FIG. 4. In response, the client 306 may accept the proposed configuration via an ACK message 316, or may not accept the suggestion via a NACK 318. In this latter case the client 304 would then choose a different common wireless protocol to suggest to the other client 306. Once the client's suggestion 314 is accepted via an ACK message 316, the wireless data session will be established between the clients.

Alternatively, the clients may utilize a protocol wherein client 306 will respond to the request 314 with a response or a NACK 320, to which client 304 will respond with an ACK or a NACK 322 before the data session may be established as illustrated in FIG. 5. If this second protocol is utilized, the response 320 may include both the client's capabilities and/or its preferences for wireless connectivity. The sending of a NACK 322 would indicate that client 304 would like to continue negotiations before the establishment of the wireless data session.

Figure 6:
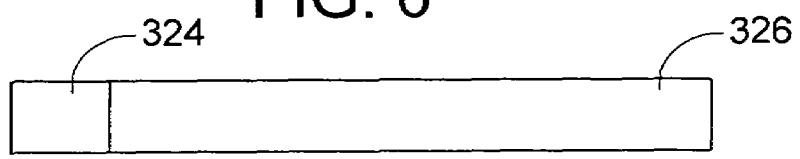
FIG. 6 is a simplified packet structure of a wireless data packet constructed in accordance with the teachings of the present invention.

As illustrated in FIG. 6, a control message includes a control command 324 section and a section for the capabilities/preferences parameters 326.

Figure 7:
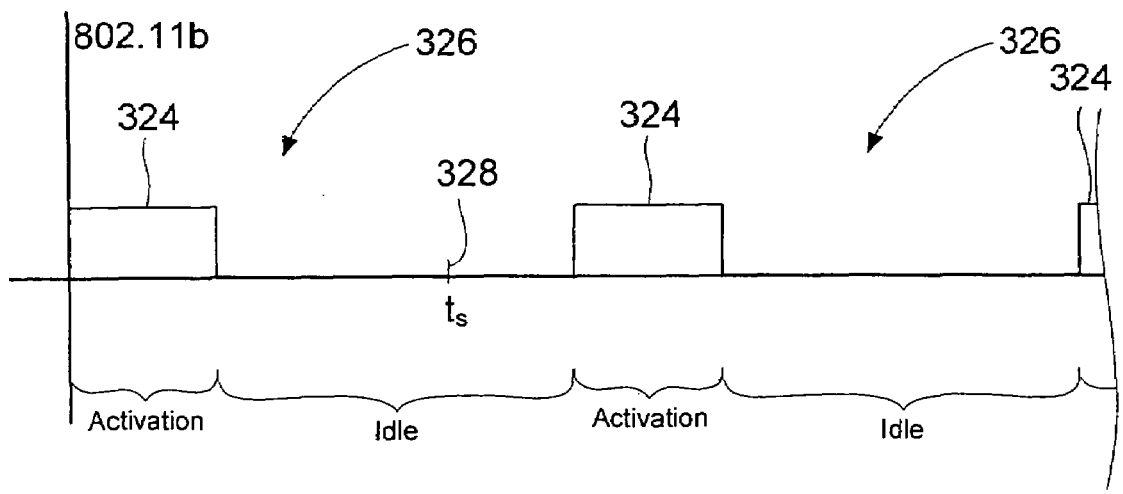
FIG. 7 illustrates an activation/idle control channel cycle in accordance with an embodiment of the present invention.

In an embodiment of the present invention that utilizes a commonly supported wireless protocol to establish the control channel, for example, the 802.11b or Wi-Fi protocol, there is no need to maintain power to the radio transmitter for that protocol once a data session has been established utilizing another wireless protocol. However, since this protocol is utilized as the control channel, control messages between the wireless clients cannot be passed unless and until the circuitry that supports this control channel protocol is powered. As such, FIG. 7 illustrates that periodic activation periods 324 are utilized during which the required circuitry for the control channel is re-powered and any required control messages are passed. As identified in the above-incorporated application, the idle periods 326 during which this circuitry is not powered may be varied based upon the fidelity of the data channel signal, etc. In this way, additional power resources are saved as the idle period 326 is lengthened when the data session is established with a strong signal. This idle period 326 may also be shortened if the established wireless data session is not particularly that strong so that changes to a different wireless protocol or other required control messages may be passed at a greater frequency.

However, there may be situations where the wireless data session as established may no longer be desirable based on a change of sensed conditions at a time $T_s$ 328 when the control channel is in an idle state 326. If the situation occurring at time $T_s$ 328 is such that the wireless protocol may be varied during the next activation period 324, such change is effectuated at that time. However, recognizing that waiting until the next activation period of the control channel protocol circuitry may not always be adequate, an embodiment of the present invention utilizes the current data session channel to transmit a control message requesting that the wireless protocol utilized for the data session be switched to another wireless protocol. Alternatively, this control message transmitted via the wireless protocol used during the wireless data session may simply re-enable the circuitry for the control channel protocol and allow the negotiation to take place via that wireless control channel.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of establishing a wireless data session between a first wireless device capable of wireless communication via at least a first wireless protocol and a second wireless device capable of wireless communication via at least the first wireless protocol, comprising the steps of: establishing a wireless control channel between the first and the second wireless devices using the first wireless protocol; exchanging wireless capability information between the first and the second wireless devices via the wireless control channel to determine common wireless capabilities including at least two common wireless protocols activating a first profile stored on the first wireless device and a second profile stored on the second wireless device when establishing the wireless control channel, each respective profile comprising preference information indicating a connection priority for the at least two common wireless protocols; negotiating a preferred wireless protocol based on the preference information, wherein negotiating comprises:

exchanging messages between the first wireless device and the second wireless device via the wireless control channel, the messages indicating the preference information for the respective wireless devices, and selecting the preferred wireless protocol as the one of the at least two common wireless protocols having a highest connection priority as indicated by the exchanged preference information; and establishing a wireless data session utilizing the preferred wireless protocol between the first and the second wireless devices.

2. The method of claim 1, further comprising the step of dynamically changing the preferred wireless protocol utilized for the wireless data session.

3. The method of claim 2, wherein the step of dynamically changing the preferred wireless protocol comprises the steps of: transmitting a control message on the wireless control channel via the first wireless protocol requesting a change in wireless protocol for the wireless data session to a different wireless protocol; re-establishing the wireless data session using the different wireless protocol.

4. The method of claim 2, wherein the step of dynamically changing the preferred wireless protocol comprises the steps of: transmitting a control message during the wireless data session requesting a change in wireless protocol to a different wireless protocol; re-establishing the wireless data session using the different wireless protocol.

5. The method of claim 1, wherein the step of establishing a wireless control channel using the first wireless protocol, comprises the step of establishing a wireless control channel using IEEE 802.11b wireless protocol.

6. A method of establishing a wireless data session between a first and a second wireless device, each device supporting multiple wireless capabilities, comprising the steps of: establishing wireless communication between the first and the second wireless devices; exchanging information identifying each wireless devices' wireless capabilities; determining common wireless capabilities including at least two common wireless protocols; activating a first profile stored on the first wireless device and a second profile stored on the second wireless device when establishing wireless communication between the first and the second wireless devices, each respective profile comprising preference information indicating a connection priority for the at least two common wireless protocols; negotiating a preferred wireless protocol based on the preference information, wherein negotiating comprises:

(A) exchanging messages between the first wireless device and the second wireless device, the messages including the preference information for the respective wireless devices; and (B) selecting the preferred wireless protocol as the one of the at least two common wireless protocols having a highest connection priority as indicated by the exchanged preference information; and utilizing the preferred wireless protocol in the wireless data session.

7. The method of claim 6, wherein the step of establishing wireless communication comprises the step of establishing wireless communication via IEEE 802.11b wireless protocol.

8. The method of claim 6, further comprising the steps of: transmitting a request to change from the preferred wireless protocol used in the wireless data session to another common wireless protocol; and re-establishing the wireless data session using the another common wireless protocol.

9. The method of claim 8, wherein the step of transmitting the request to change from the preferred wireless protocol used in the wireless data session to another common wireless protocol comprises the step of transmitting the request utilizing the preferred wireless protocol.

10. The method of claim 8, wherein the step of establishing wireless communication between the first and the second wireless devices comprises the step of utilizing a first wireless protocol for the wireless communication, wherein the step of negotiating the preferred wireless protocol results in utilizing a second wireless protocol in the wireless data session, and wherein the step of transmitting the request to change from the preferred wireless protocol used in the wireless data session to another common wireless protocol comprises the step of transmitting the request utilizing the first wireless protocol.

11. A first wireless device, comprising: a wireless network interface including communication circuitry adapted to communicate in accordance with at least one wireless protocol; and a network driver including a wireless capabilities manager, the wireless capabilities manager configuring the wireless network interface to utilize a particular wireless protocol to establish wireless communication with a second wireless device, wherein the wireless capabilities manager:

(A) provides first information of wireless capabilities supported by the first wireless device to the wireless network card for transmission via the particular wireless protocol;

(B) receives second information of wireless capabilities supported by the second wireless device via the particular wireless protocol;

(C) compares the first information with the second information to determine common wireless capabilities including at least two common wireless protocols;

(D) negotiates a preferred wireless protocol from the at least two common wireless protocols based on preference information stored on the first wireless device and the second wireless device, the preference information indicating connection priorities for the at least two common wireless protocols on each of the respective wireless devices, wherein negotiating comprises:

i. exchanging messages between the first wireless device and the second wireless device, the messages indicating the preference information for the respective wireless devices; and ii. selecting the preferred wireless protocol as the one of the at least two common wireless protocols having a highest connection priority as indicated by the exchanged preference information; and (E) configures the wireless interface to utilize the preferred wireless protocol.

12. The first wireless device of claim 11, wherein the wireless capabilities manager disables all communication circuitry not required to communicate via the preferred wireless protocol.

13. The first wireless device of claim 11, wherein the wireless network interface includes communication circuitry adapted to communicate in accordance with a plurality of wireless protocols, and wherein the wireless capabilities manager disables the communication circuitry adapted to communicate in accordance with all wireless protocols other than the particular wireless protocol used to establish wireless communication with the second wireless device.

* * * * *